N. LIBOTTE.
SAFETY APPARATUS FOR MINES AND HOISTS.

No. 177,256. Patented May 9, 1876.

UNITED STATES PATENT OFFICE.

NICOLAS LIBOTTE, OF GILLY, BELGIUM.

IMPROVEMENT IN SAFETY APPARATUS FOR MINES AND HOISTS.

Specification forming part of Letters Patent No. 177,256, dated May 9, 1876; application filed April 27, 1876.

*To all whom it may concern:*

Be it known that I, NICOLAS LIBOTTE, of Gilly, in the Kingdom of Belgium, have invented an Improved Safety Apparatus applicable to cages used in the shafts of Mines and Hoists; and I do hereby declare that the following is an exact description thereof.

This invention relates to safety means for arresting the descent of cages or cars in mine-shafts and hoistways, and has for its object the gradual, but sure, stoppage of the cage or car as distinguished from an abrupt stoppage of the same in case of the hoisting cable or rope breaking, or of the cage or car becoming detached from said cable or rope.

The invention consists in a novel combination of friction blocks or wedges within inclined guiding-shoes attached to the cage or car, said blocks being controlled by levers, rods, and springs, subject to the action or breakage of the hoisting chain or cable, and bearing, when in action, against fixed guides in the shaft or hoistway, substantially as hereinafter described.

Figure 1:
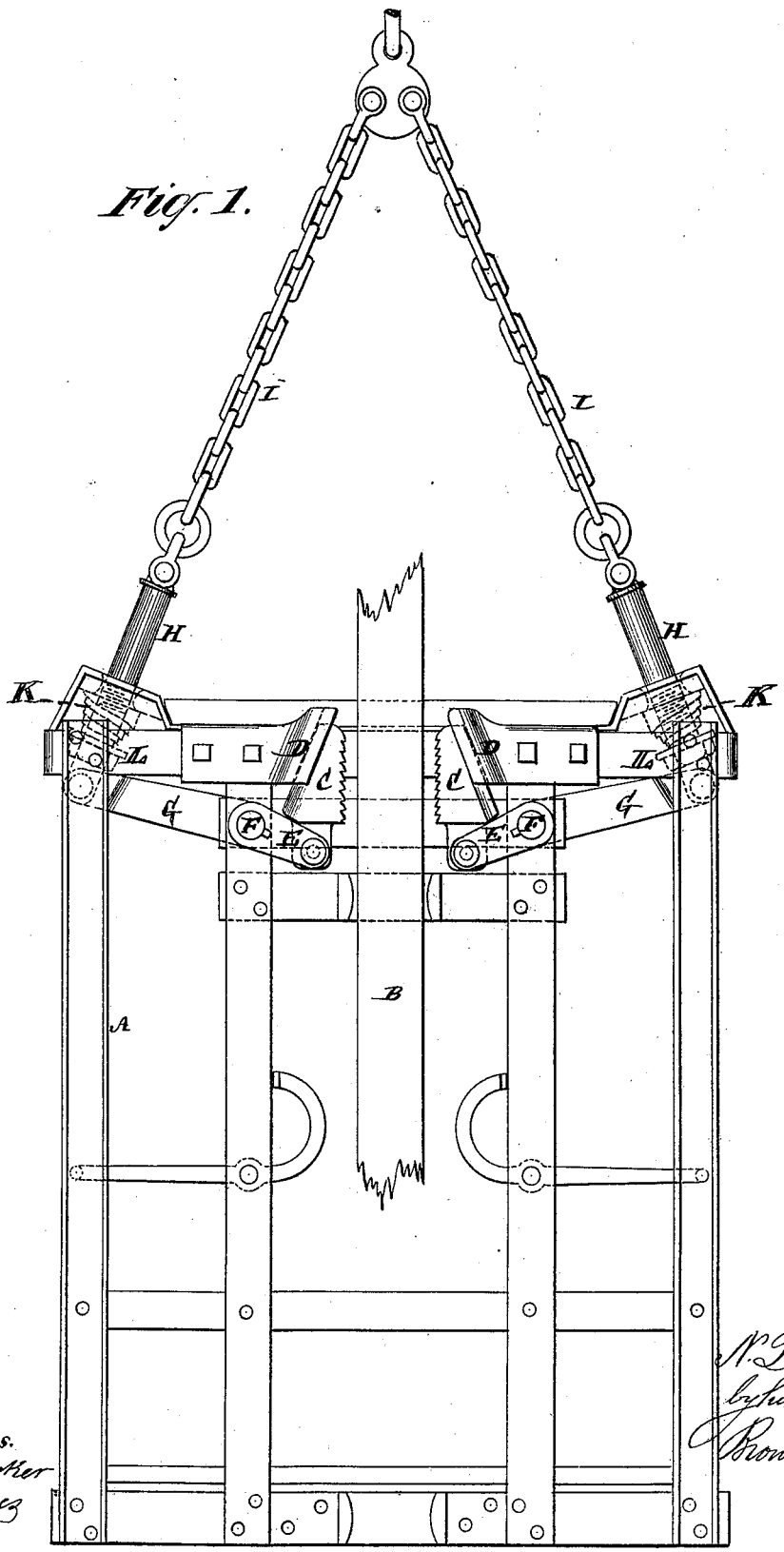
Figure 2:
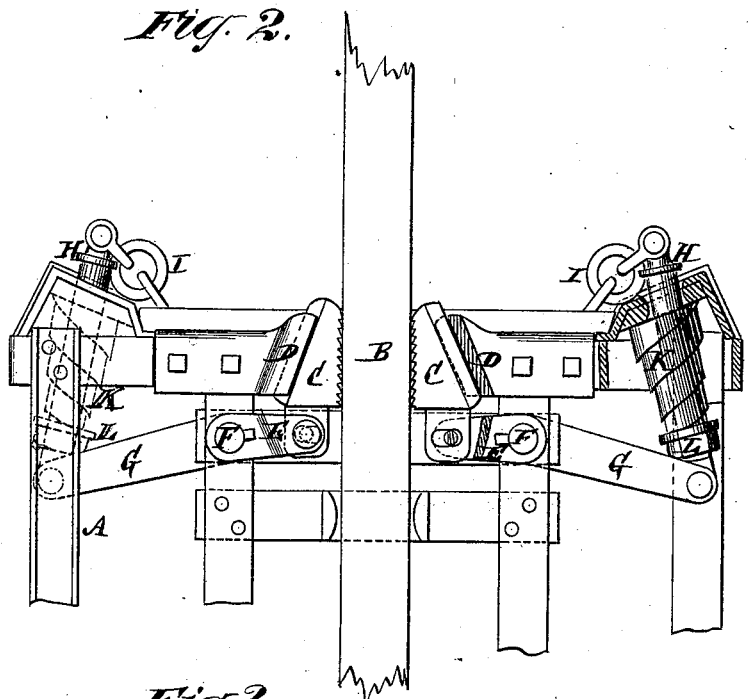
Figure 3:
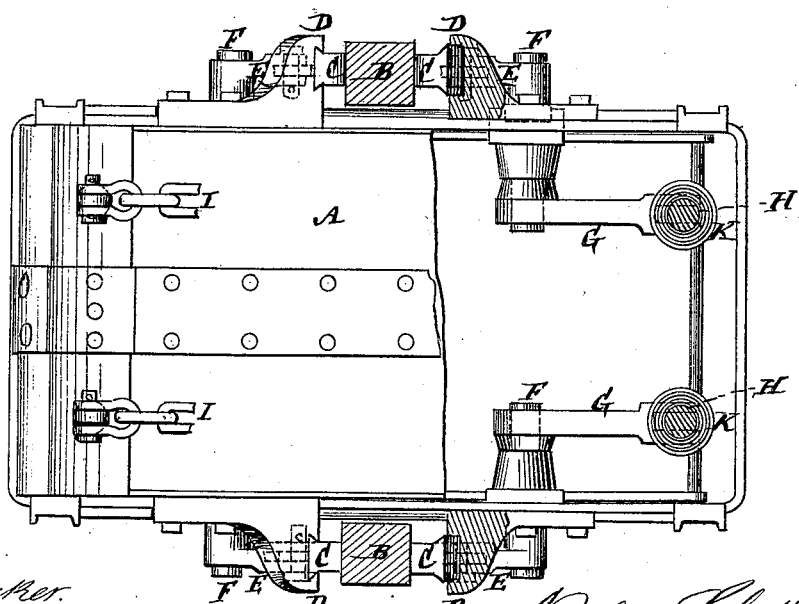

In the accompanying drawing, Figure 1 represents a side elevation of a cage, such as are used in the shaft of a mine with my improved safety means applied, but as open or free from operation on the guide-timbers in the shaft. Fig. 2 is a further side elevation of the upper part of the cage with the safety means as closed on the guide-timbers of the shaft; and Fig. 3, a plan and half-section of the cage with its attached safety means.

A is the cage, and B the guides or guide-timbers of the shaft, up and down which the cage is directed in its travel, and against which the gripe is made to check the cage in its descent in case of the hoisting-cable breaking. C C are friction blocks or wedges on opposite sides of the guides B B, on or against which said blocks are borne when called into requisition to sustain the cage or car in case of its too rapid descent. These friction blocks or wedges are fitted to slide up and down in obliquely grooved or constructed shoes D, within which the inclined backs of the blocks C work, and which are securely connected with the upper frame of the cage, the grooved inclination of the shoes D and the inclined backs of the friction blocks or wedges C being such that an up motion of said blocks serves to bind their front and parallel faces against the guides B, while a downward motion of the same liberates them from a bearing action on said guides B. To secure a firm hold or gripe for the friction blocks or wedges on the guides B, said blocks are corrugated or roughened on their parallel and approximate faces. The gradual action of the friction-blocks C, by reason of their inclined or wedge-shaped construction, upon the guides B insures a gentler and more perfect or surer action for said blocks than if they were brought suddenly into an abrupt action or gripe. This skidding action of the friction-blocks is important, and by it the falling of the cage to the bottom of the shaft may be considered as impossible.

The friction blocks or wedges C C are attached at their lower ends to cranks E E, the shafts F F of which are in the side frames of the cage, said shafts either extending wholly across the frame on opposite sides of the guides B B, or each crank E having an independent shaft of its own. Attached to these shafts F, on the reverse or outer sides of their axes from the sides on which the cranks E are arranged, are levers G G. These levers are connected at their lower ends with rods H H, passing up through the top frame and roof of the cage, and to the upper ends of which the hoisting chain or cable is attached by any suitable connection, and diverging chains I I, which virtually form part of the hoisting-cable. These rods H have volute springs K arranged round them, said springs bearing at their upper ends under cross hollow transoms of the roof of the cage, and at their lower ends against tension-adjusting nuts L on the rods H. There is an independent rod, H, for each upper corner of the cage, and each rod is separately connected at its upper end with the central hoisting-cable.

From this description it will readily be seen that in case of the hoisting-cable or any of its diverging connecting-chains breaking the friction blocks or wedges C C will be caused, by means of the springs K, to bear with a gradual or skidding action against the guides B, but at other times said friction-blocks are held free from contact with said guides. If desired, each pair of levers G, on opposite sides of the guides B, may be connected by crossbars to insure their action in concert.

While the action of these safety means is such that even when the cage is only slightly loaded it is positively arrested in case of accident, the guides B are protected from any rough usage or wear both when the cage, although heavily loaded, is started and when under way.

I claim—

The combination of the friction blocks or wedges C C with the inclined guiding-shoes D D attached to the cage A, the levers E G, the rods H, and the springs K, arranged for operation in relation with each other, and with the guides B and hoisting chain, rope, or cable, substantially as shown and described.

N. LIBOTTE.

Witnesses:
JNO. WILSON,
JOHN NORTON.